(12) United States Patent
Konji et al.

(10) Patent No.: US 7,589,853 B2
(45) Date of Patent: Sep. 15, 2009

(54) IMAGE FORMING SYSTEM, AND INFORMATION PROCESSING APPARATUS AND METHOD

(75) Inventors: Mitsuru Konji, Kawasaki (JP); Kenichiro Uotani, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 875 days.

(21) Appl. No.: 11/044,845

(22) Filed: Jan. 27, 2005

(65) Prior Publication Data
US 2005/0179940 A1    Aug. 18, 2005

(30) Foreign Application Priority Data
Jan. 29, 2004    (JP)    ............... 2004-021299

(51) Int. Cl.
G06F 3/12    (2006.01)
G06F 13/00    (2006.01)
H04N 1/40    (2006.01)
H04N 1/48    (2006.01)

(52) U.S. Cl. ............... 358/1.15; 358/1.13; 358/426.02; 358/426.07; 358/3.03; 382/251; 382/252; 375/240.03

(58) Field of Classification Search ............... 358/1.15, 358/3.03, 426.02, 1.13, 426.07; 382/251, 382/252; 375/240.03
See application file for complete search history.

(56) References Cited

U.S. PATENT DOCUMENTS

| 5,883,979 | A * | 3/1999 | Beretta et al. ............... 382/251 |
| 6,025,929 | A | 2/2000 | Nakajima |
| 2003/0107753 | A1 | 6/2003 | Sakamoto |
| 2003/0184813 | A1 * | 10/2003 | Kobayashi et al. ..... 358/426.01 |
| 2004/0179237 | A1 * | 9/2004 | Takenaka et al. ............. 358/2.1 |
| 2005/0088697 | A1 * | 4/2005 | Yasutomi et al. ............. 358/2.1 |

FOREIGN PATENT DOCUMENTS

| JP | 2000-280582 A | 10/2000 |
| JP | 2001-075765 A | 3/2001 |
| JP | 2003-114778 A | 4/2003 |

* cited by examiner

Primary Examiner—Twyler L Haskins
Assistant Examiner—Dennis Dicker
(74) Attorney, Agent, or Firm—Canon U.S.A. Inc., I.P. Division

(57) ABSTRACT

In an image forming system, an information processing apparatus (host computer) outputs print data to a printer connected to the apparatus through an interface. The apparatus includes an interface identifying module for identifying the type of the interface, a query module for determining, based on the identified interface type, a quantization method for quantizing print data and/or a compression method, and an image processing module for performing quantization and/or compression on the print data by the determined quantization method and/or compression method. The apparatus outputs, to the printer, the print data processed by the image processing module.

12 Claims, 13 Drawing Sheets

FIG. 3

| INTERFACE TYPE | PRINTING CONDITION (PAPER TYPE) | QUANTIZATION METHOD (NUMBER OF BITS) |
|---|---|---|
| ......... | ......... | ......... |
| USB | PHOTOGRAPHIC GLOSSY PAPER | 4 |
| USB | PLAIN PAPER | 2 |
| Bluetooth | PHOTOGRAPHIC GLOSSY PAPER | 2 |
| Bluetooth | PLAIN PAPER | 1 |
| ......... | ......... | ......... |
| ......... | ......... | ......... |

FIG. 6

| INTERFACE TYPE | PRINTING CONDITION (PAPER TYPE) | PRINTING CONDITION RESTRICTION ITEMS | |
| --- | --- | --- | --- |
| | | QUANTIZATION METHOD | COMPRESSION METHOD |
| ........ | ........ | ........ | ........ |
| USB | PHOTOGRAPHIC GLOSSY PAPER | QUANTIZATION A | COMPRESSION A |
| USB | PLAIN PAPER | QUANTIZATION A | COMPRESSION A |
| Bluetooth | PHOTOGRAPHIC GLOSSY PAPER | QUANTIZATION B | COMPRESSION B |
| Bluetooth | PLAIN PAPER | QUANTIZATION A | COMPRESSION A |
| ........ | ........ | ........ | ........ |

250

| FIRST THREE LETTERS OF INTERFACE NAME | INTERFACE TYPE |
|---|---|
| "USB" | USB |
| "LPT" | IEEE1284 |
| "BTH" | Bluetooth |

FIG. 11

| INTERFACE TYPE | SET QUANTIZATION METHOD | QUANTIZATION METHOD FOR USE | COMPRESSION METHOD FOR USE |
|---|---|---|---|
| USB | AUTOMATIC | ERROR DIFFUSION | COMPRESSION A |
| USB | DITHERING | DITHERING | COMPRESSION A |
| USB | ERROR DIFFUSION | ERROR DIFFUSION | COMPRESSION A |
| IEEE 1284 | AUTOMATIC | ERROR DIFFUSION | COMPRESSION A |
| IEEE 1284 | DITHERING | DITHERING | COMPRESSION A |
| IEEE 1284 | ERROR DIFFUSION | ERROR DIFFUSION | COMPRESSION A |
| Bluetooth | AUTOMATIC | DITHERING | COMPRESSION B |
| Bluetooth | DITHERING | DITHERING | COMPRESSION B |
| Bluetooth | ERROR DIFFUSION | ERROR DIFFUSION | COMPRESSION A |

| INTERFACE TYPE | SET QUANTIZATION METHOD | QUANTIZATION METHOD FOR USE | COMPRESSION METHOD FOR USE |
|---|---|---|---|
| USB | AUTOMATIC | ERROR DIFFUSION | COMPRESSION A |
| USB | DITHERING | DITHERING | COMPRESSION B |
| USB | ERROR DIFFUSION | ERROR DIFFUSION | COMPRESSION A |
| IEEE 1284 | AUTOMATIC | ERROR DIFFUSION | COMPRESSION A |
| IEEE 1284 | DITHERING | DITHERING | COMPRESSION B |
| IEEE 1284 | ERROR DIFFUSION | ERROR DIFFUSION | COMPRESSION A |
| Bluetooth | AUTOMATIC | DITHERING | COMPRESSION B |
| Bluetooth | DITHERING | DITHERING | COMPRESSION B |
| Bluetooth | ERROR DIFFUSION | ERROR DIFFUSION | COMPRESSION A |

IMAGE FORMING SYSTEM, AND INFORMATION PROCESSING APPARATUS AND METHOD

CROSS REFERENCE TO RELATED APPLICATIONS

This application is related to co-pending applications 11/044,985 and 11/044,447 filed on Jan. 27, 2005.

BACKGROUND OF THE INVENTION

1. Field of the Invention

The present invention relates to image forming systems including image forming apparatuses and information processing apparatuses, to information processing apparatuses, and to methods for processing image forming data for use in image forming systems. More specifically, the present invention relates to an image forming system, an information processing apparatus, and a method for processing image forming data in which image-forming print data generated by the information processing apparatus is transmitted to an image forming apparatus and the image forming apparatus forms an image based on the print data.

2. Description of the Related Art

Conventionally, for example, when an information processing apparatus, such as a personal computer, uses a printer to print out print data, such as a document or an image, which is edited by an application for document editing or image editing, it is common for the information processing apparatus to perform quantization and compression in order to reduce the size of print data to be transmitted to the printer. In this case, the quantization method is determined in response to printing conditions set by a user or based on the content of the print data, the determined quantization method is used to quantize the print data, and the quantized print data is compressed with a predetermined compression method before being transmitted to the printer (see, for example, Japanese Patent Laid-Open No. 10-13674).

Currently widely used quantization methods are dithering and error diffusion. It is common to use dithering to perform quantization for print data such as text and flowcharts, and it is common to use error diffusion to perform quantization for print data such as photographs.

When the quantized print data is compressed, in general, print data quantized by dithering, which uses a combination of patterns, tends to have a compression rate higher than that of print data quantized by error diffusion, although the compression rate depends on the content of the print data.

Various types of interfaces can be used for the information processing apparatus (host computer) to transmit print data to the printer. Currently widely used interfaces include USB (universal serial bus) 1.1, USB 2.0, and IEEE 1284 (parallel port standard). In addition, other interfaces in use include IEEE 1394, Bluetooth, IrDA (Infrared Data Association), and wireless LANs. Many printers support a plurality of interfaces for transmitting print data. A user can select an interface for transmitting print data from among the supported interfaces.

As described above, there are a plurality of interfaces for use in transmitting print data from a host computer to a printer. A speed at which the print data is transmitted to the printer, that is, the time required to transmit the print data to the printer, greatly differs depending on the interface used.

The print data that passes through the interface connecting the host computer and the printer has a relatively large size. Thus, even if the host computer and the printer have high processing speeds, in the case of using, for example, a low speed interface, such as Bluetooth, which is inferior to other interfaces (e.g., USB) in speed and transmission range, the low speed interface requires a much longer time for printing to complete, compared with the high speed interface.

When, in order to reduce data size, a compression method enabling a high compression rate is used even if the interface is capable of high speed transfer, decompression requires a great amount of time. Accordingly, simple reduction of the data size does not always shorten the time required to complete printing. However, processing in the present image forming system is not performed with interface features considered.

SUMMARY OF THE INVENTION

The present invention performs, in an image forming system including an information processing apparatus (host computer) and an image forming apparatus that are connected to each other by an interface, appropriate processing on print data for use in image formation in response to features of the interface between the information processing apparatus and the image forming apparatus.

According to a first aspect of the present invention, an information processing apparatus for outputting image-forming print data to an external image-forming apparatus connected to the information processing apparatus through an interface is provided. The information processing apparatus includes an identifying unit for identifying the type of the interface, a determining unit for determining, based on the type of the interface identified by the identifying unit, a quantization method for quantizing print data, and an image processing unit for quantizing the print data by using the quantization method determined by the determining unit. The print data quantized by the image processing unit is output to the external image-forming apparatus through the interface.

According to a second aspect of the present invention, an image forming system is provided which includes the information processing apparatus according to the first aspect of the present invention, and an image forming apparatus. Both apparatuses are connected to each other by an interface.

According to a third aspect of the present invention, an information processing apparatus for outputting image-forming print data to an external image-forming apparatus connected to the information processing apparatus through an interface is provided. The information processing apparatus includes an identifying unit for identifying the type of the interface, a determining unit for determining, based on the type of the interface identified by the identifying unit, a compression method for compressing print data, and an image processing unit for compressing the print data by using the compression method determined by the determining unit. The print data compressed by the image processing unit is output to the external image-forming apparatus through the interface.

According to a fourth aspect of the present invention, an image forming system is provided which includes the information processing apparatus according to the third aspect of the present invention, and an image forming apparatus. Both apparatuses are connected to each other by an interface.

According to a fifth aspect of the present invention, an information processing method for outputting image-forming print data to an external image-forming apparatus connected through an interface is provided. The information processing method includes identifying the type of the interface, determining a quantization method for quantizing print data based on the type of the interface, quantizing the print data using the quantization method, and outputting the print data quantized to the external image-forming apparatus through the interface.

According to a sixth aspect of the present invention, a program executable by an information processing apparatus is provided. The program has program code for implementing the information processing method according to the fifth aspect of the present invention.

According to a seventh aspect of the present invention, an information processing method for outputting image-forming print data to an external image-forming apparatus connected through an interface is provided. The information processing method includes identifying the type of the interface, determining a compression method for compressing the print data based on the type of the interface, compressing the print data by using the compression method, and outputting the print data compressed using the compression method to the external image-forming apparatus through the interface.

According to an eighth aspect of the present invention, a program executable by an information processing apparatus is provided. The program has program code for implementing the information processing method according to the seventh aspect of the present invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a quantization-method determining table in the first embodiment of the present invention.

FIG. 6 is a quantization-and-compression-method determining table in the second embodiment of the present invention.

FIG. 11 is an example of a printing condition information table stored in a printer graphics driver in the third embodiment of the present invention.

FIG. 14 is another example of the printing condition information table stored in the printer graphics driver.

DESCRIPTION OF THE EMBODIMENTS

Exemplary embodiments of the present invention will now be described in detail in accordance with the accompanying drawings.

First Embodiment

Figure 1:
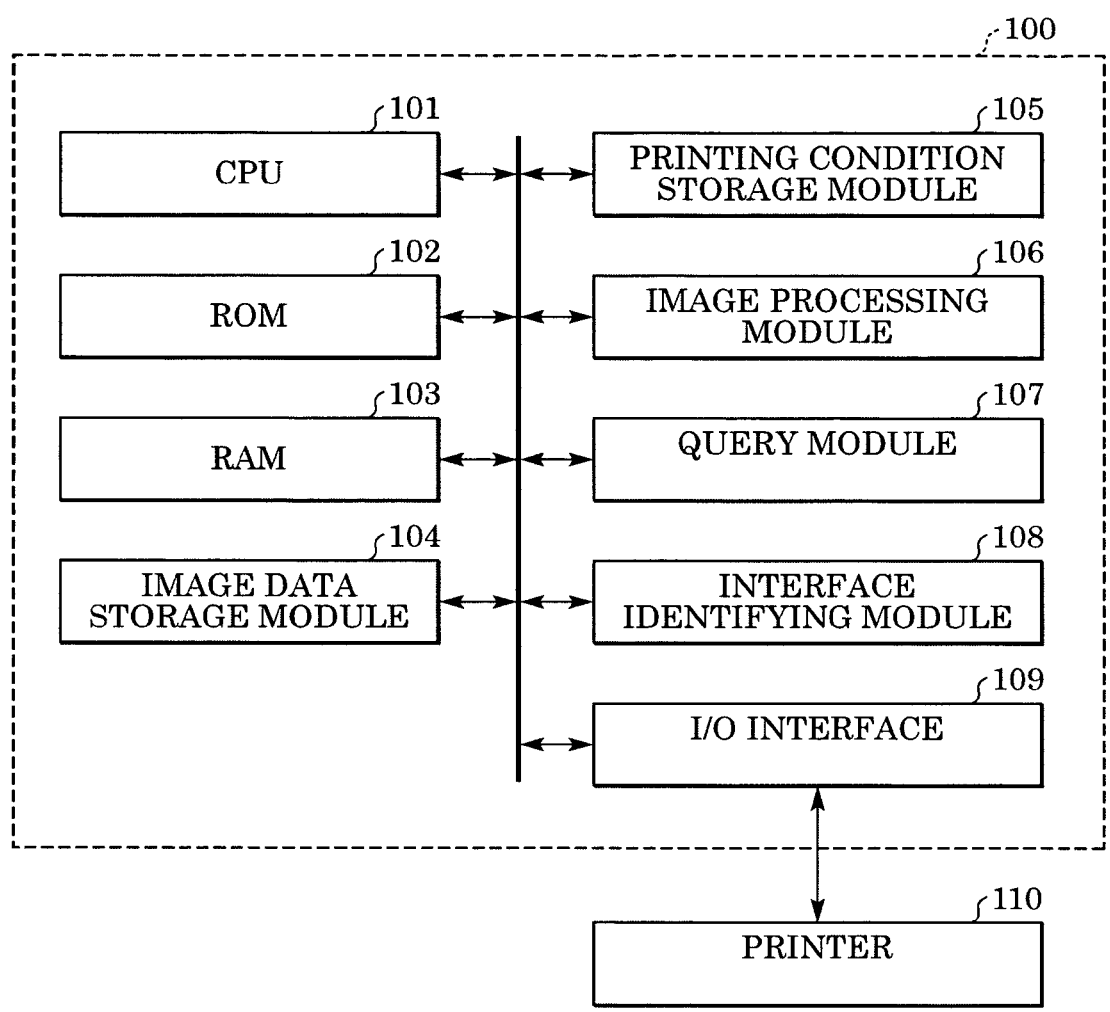
FIG. 1 is a block diagram showing the configuration of a printing system according to a first embodiment of the present invention.

FIG. 1 shows the configuration of a printing system according to a first embodiment of the present invention. In FIG. 1, the printing system shown in FIG. 1 includes a host computer 100 and a printer 110 serving as an image forming apparatus. As the host computer 100, a multi-purpose computer or an information processing device, such as a microcomputer built in a portable apparatus or an electronic camera, can be used. The host computer 100 includes a central processing unit (CPU) 101, a read-only memory (ROM) 102, a random access memory (RAM) 103, an input/output (I/O) interface 109, an image data storage module 104, a printing condition storage module 105, an image processing module 106, a query module 107, and an interface identifying module 108. Each module may be formed either by hardware or by software.

Figure 2:
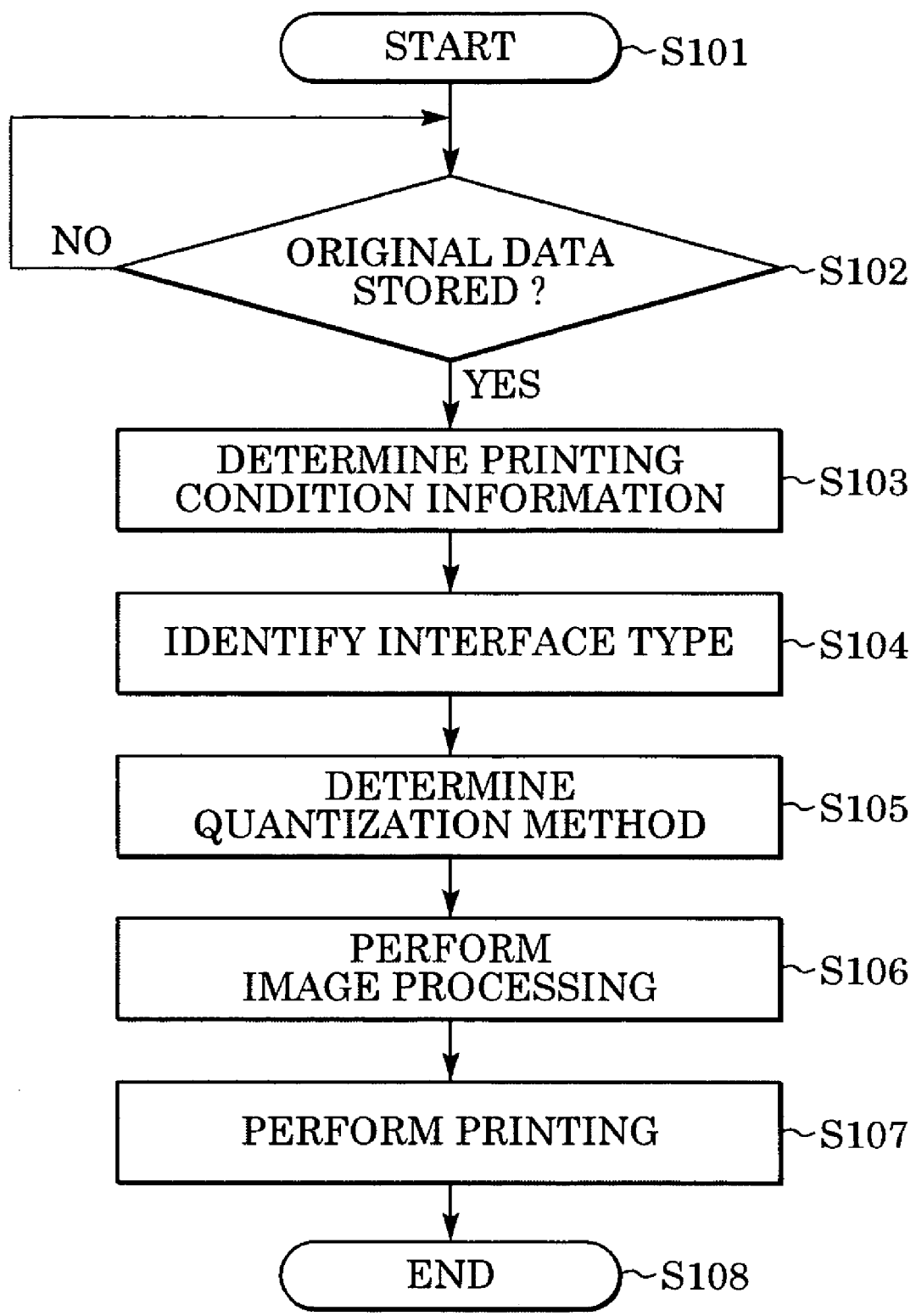
FIG. 2 is a flowchart showing a process of a host computer in the first embodiment of the present invention.

Next, a process of the host computer 100 in the first embodiment of the present invention is described with reference to FIG. 2. This process is performed by the CPU 101 based on a program stored in the ROM 102.

After the process is started in step S101, in step S102, the CPU 101 determines whether original data, such as a document or an image, is stored in the image data storage module 104. The CPU 101 waits for the image data storage module 104 to store the original data. The original data is obtained such that, when printing is executed by application software or the like, information related thereto is stored in the image data storage module 104.

If it is determined in step S102 that the original data is stored in the image data storage module 104, the process proceeds to step S103. In step S103, a user interface (not shown) or the like is used to determine printing condition information. The printing condition information is information for use in converting the original data, such as a printing layout and printing quality, to print data. The determined printing condition information is stored in the printing condition storage module 105.

After the printing condition information is determined, the process proceeds to step S104. In step S104, the interface identifying module 108 identifies the type of an interface for connecting the host computer 100 and the printer 110. The interface type identified by the interface identifying module 108 is also stored in the printing condition storage module 105.

After the interface type is identified, in step S105, the query module 107 determines a quantization method. The query module 107 determines the quantization method by using, as search conditions, the interface type and printing condition information stored in the printing condition storage module 105. The determined quantization method is stored in the printing condition storage module 105. A method for determining the quantization method is described later.

After the quantization method is determined, in step S106, the image processing module 106 generates print data by performing image processing, such as quantization, on the original data stored in the image data storage module 104. The image processing module 106 refers to image-processing-related information stored in the printing condition storage module 105, and performs image processing in accordance therewith. The print data is stored in the image data storage module 104.

After the print data is generated, in step S107, the print data store in the image data storage module 104 is transferred to the printer 110 through the I/O interface 109, and the process of the host computer 100 ends.

Next, the method for determining the quantization method in step S105 is described below.

In the first embodiment of the present invention, by using the quantization-method determining table 150 shown in FIG. 3, the quantization method is determined. The quantization-method determining table 150 is stored in the query module 107. The query module 107 determines the quantization method by referring to the quantization-method determining table 150. The quantization-method determining table 150 can be stored in another storage module (not shown).

The quantization-method determining table 150 stores quantization methods optimal for interface types to be identified in step S104 in accordance with printing conditions to be determined in step S103. The quantization-method determining table 150 shown in FIG. 3 shows interface types, paper types used as a printing condition, and the numbers of bits for the paper types which are output by quantization methods. The quantization-method determining table 150 shows USB (Universal Serial Bus) capable of high speed transfer and Bluetooth capable of only low speed transfer. The quantization-method determining table 150 also shows photographic glossy paper and plain paper as examples of paper types. Photographic glossy paper requires a high resolution since it is used to print a photograph. In general, print data for printing on photographic glossy paper has a large size. Conversely, in general, print data for printing on plain paper has a size smaller than that in the case of using photographic glossy paper.

The number of bits output by the quantization method is a value representing the number of grayscales for representing each pixel of the original data. In general, the size of print data increases as the number of the bits increases. Accordingly, if the paper type is the same, when comparing the numbers of output bits of the USB capable of high speed transfer and Bluetooth capable of only low speed transfer, the number of output bits of the USB is set to be larger. If the interface is the same, when comparing the numbers of output bits for photographic glossy paper, which requires a high resolution, and plain paper, the number of output bits for the photographic glossy paper is set to be larger.

By referring to the quantization-method determining table 150, the query module 107 determines the number of output bits at which the printing condition (paper type) acquired in step S103 matches the interface type acquired in step S104.

As described above, according to the first embodiment of the present invention, by changing the number of output bits of quantization in accordance with the feature of the interface and the printing condition, the size of print data can be adjusted.

The case of using a technique for changing the number of output bits, as the quantization method, has been described. However, the quantization itself can be changed, such as dithering and error diffusion.

Second Embodiment

Next, a second embodiment of the present invention is described below.

Figure 4:
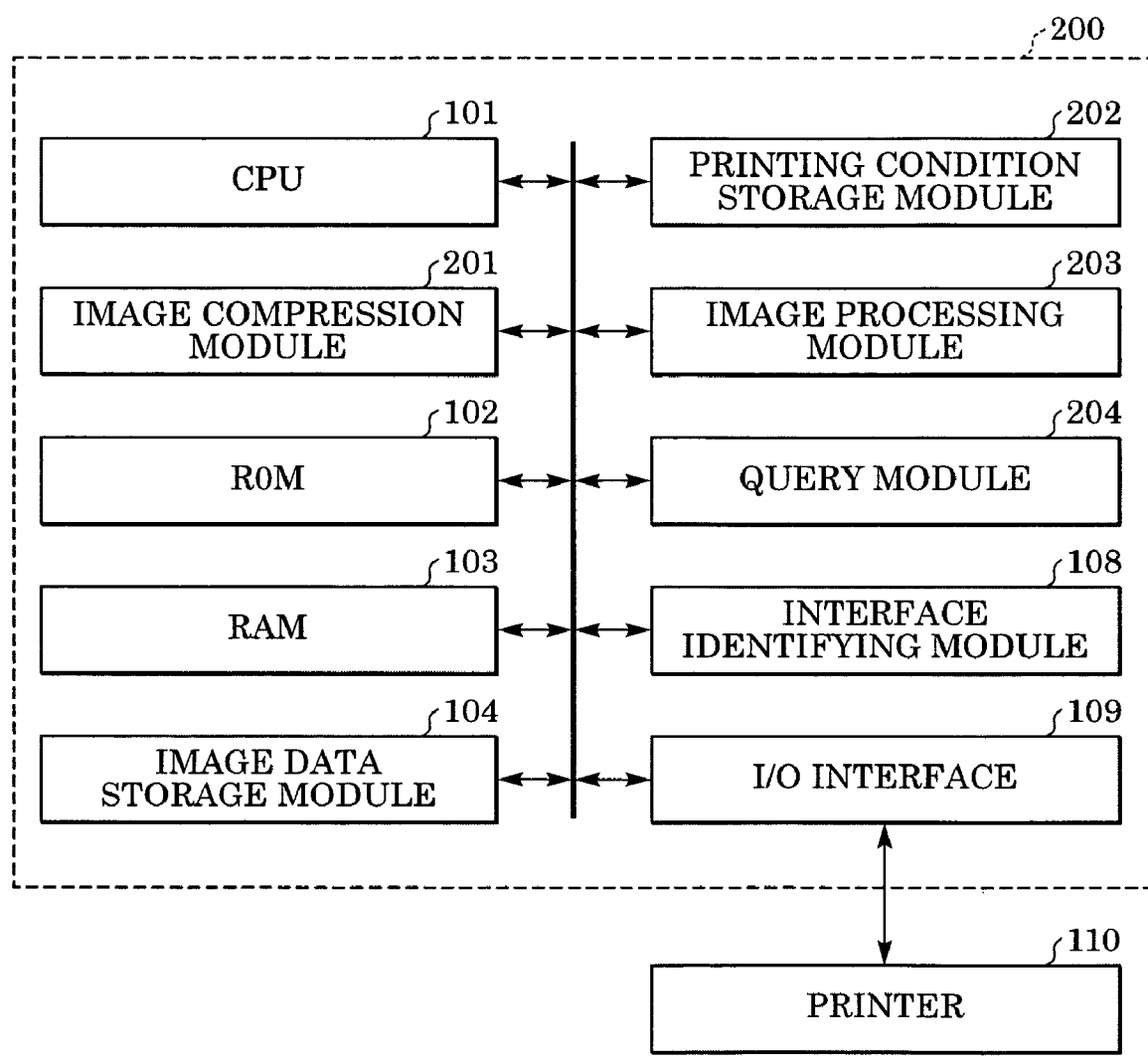
FIG. 4 is a block diagram showing the configuration of a printing system according to a second embodiment of the present invention.

FIG. 4 shows the configuration of a printing system according to the second embodiment of the present invention. In FIG. 4, the printing system shown in FIG. 4 includes a printer 110 as an image forming apparatus and a host computer 200. Similarly to the first embodiment, a multi-purpose computer or an information processing device, such as a microcomputer built in a portable apparatus or an electronic camera, can be used as the host computer 200. The host computer 200 according to the second embodiment of the present invention includes a CPU 101, a ROM 102, a RAM 103, an I/O interface 109, an image compression module 201, an image data storage module 104, a printing condition storage module 202, an image processing module 203, a query module 204, and an interface identifying module 108. Each module may be formed either by hardware or by software.

Figure 5:
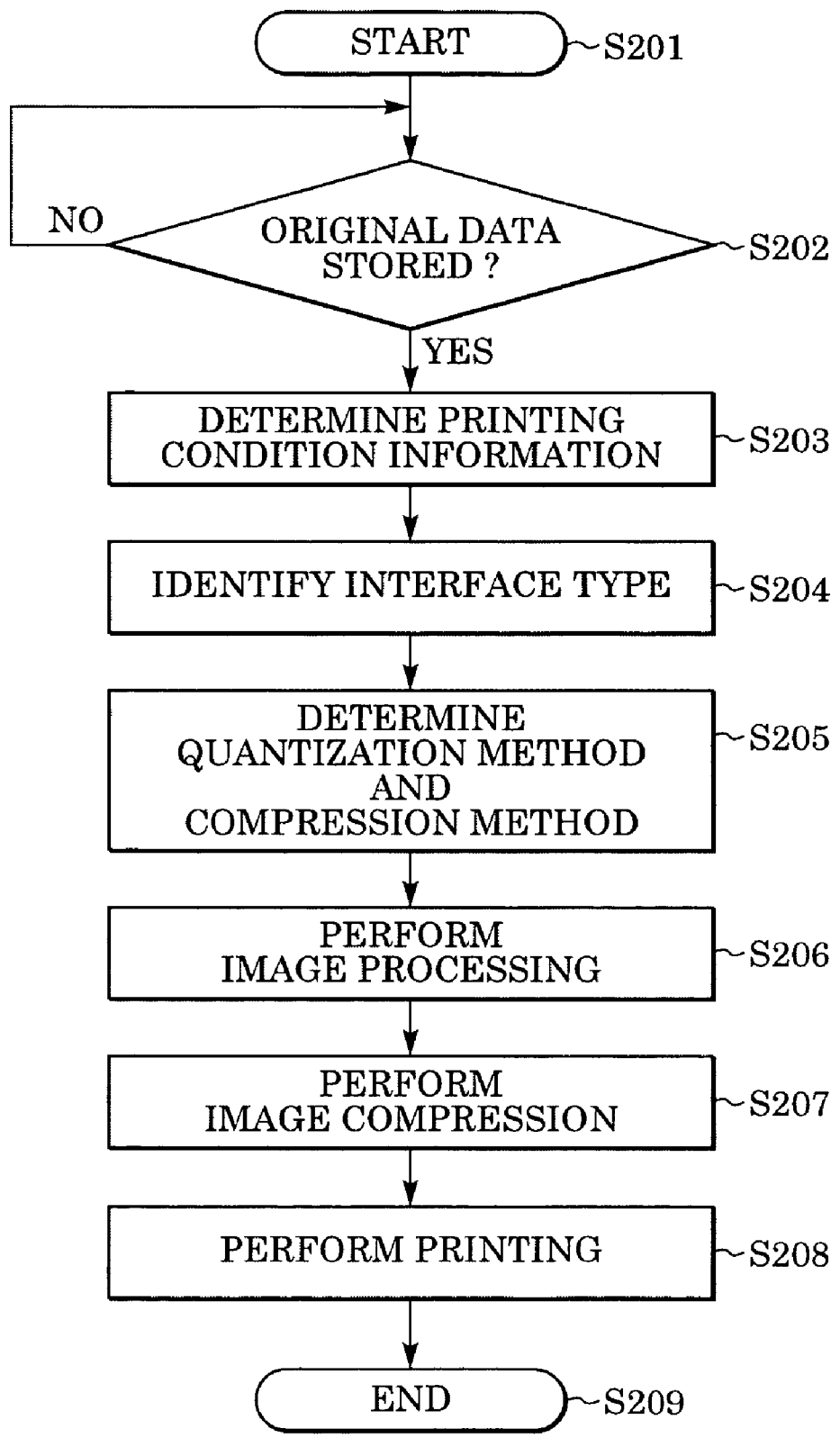
FIG. 5 is a flowchart showing a process of a host computer according to the second embodiment of the present invention.

Next, a process of the host computer 200 according to the second embodiment of the present invention is described below with reference to FIG. 5. This process is performed by the CPU 101 based on a program stored in the ROM 102.

After the process is started in step S201, in step S202, the CPU 101 determines whether original data, such as a document or an image, is stored in the image data storage module 104. The CPU 101 waits for the image data storage module 104 to store the original data. The original data is obtained such that, when printing is executed by application software or the like, information related thereto is stored in the image data storage module 104.

If it is determined in step S202 that the original data is stored in the image data storage module 104, the process proceeds to step S203. In step S203, similarly to the step S103 shown in FIG. 2 in the first embodiment, printing condition information is determined. The determined printing condition information is stored in the printing condition storage module 202.

After the printing condition information is determined, the process proceeds to step S204. In step S204, the interface identifying module 108 identifies the type of interface for connecting the host computer 200 and the printer 110. The interface type identified by the interface identifying module 108 is also stored in the printing condition storage module 202.

After the interface type is identified, in step S205, the query module 204 determines a combination of a quantization method and an image compression method. The query module 204 determines the combination of the quantization method and the image compression method by using, as search conditions, the interface type and printing condition information stored in the printing condition storage module 202. The determined combination of the quantization method and the image compression method is stored in the printing condition storage module 202. A method for determining the combination of the quantization method and the image compression method is described later.

After the combination of the quantization method and the image compression method is determined, in step S206, the image processing module 203 generates print data by performing image processing, such as quantization, on the original data stored in the image data storage module 104. The image processing module 203 refers to image-processing-related information stored in the printing condition storage module 202, and performs image processing in accordance therewith. The print data is stored in the image data storage module 104.

In step S207, the image compression module 201 uses the printing condition storage module 202 to compress the print data stored in the image data storage module 104. The printing condition storage module 202 refers to the image compression method stored in the printing condition storage module 202, and performs image compression in accordance therewith. The compressed print data is stored in the image data storage module 104.

After the image compression is performed, the process proceeds to step S208. In step S208, the compressed print data stored in the image data storage module 104 is transferred to the printer 110 through the I/O interface 109, and the process of the host computer 200 ends.

Next, the method performed in step S205 for determining the combination of the quantization method and the image compression method is described below.

In the second embodiment of the present invention, the quantization-and-compression-method determining table 250 shown in FIG. 6 is used to determine the combination of the quantization method and the image compression. The quantization-and-compression-method determining table 250 is stored in the query module 204. The query module 204 determines the combination of the quantization method and the compression method by referring to the quantization-and-compression-method determining table 250. The quantization-and-compression-method determining table 250 can be stored in separate storage modules (not shown).

In the quantization-and-compression-method determining table 250, quantization methods and compression methods are combined so that the time from the start of printing to actual output of print data through the printer 110 is the shortest. In this case, also the time required for the printer 110 to load the compressed print data is considered. The quantization-and-compression-method determining table 250 shown in FIG. 6 contains interface types, paper types as a printing condition, and combinations of quantization methods and image compression methods for the paper types. The quantization-and-compression-method determining table 250 shows USB capable of high speed transfer and Bluetooth capable of only low speed transfer. The quantization-and-compression-method determining table 250 also shows photographic glossy paper and plain paper as examples of paper types. In the quantization-and-compression-method determining table 250, the number of output bits in Quantization Method A is larger than the number of output bits in Quantization Method B, and the compression rate of Compression Method A is lower than the compression rate of Compression Method B, so that Compression Method A produces a larger amount of image data. In other words, when print data is generated by using Quantization Method A and Compression Method A to process data, the size of the print data is the largest. Conversely, when print data is generated by using Quantization Method B and Compression Method B to process data, the size of the print data is the smallest. Accordingly, the latter case needs a shorter time for transferring the print data. However, when compressed print data is loaded into the printer 110, the case of using Compression Method A produces a loading speed higher than that in the case of using Compression Method B. By way of example, error diffusion is used as Quantization Method A, and dithering is used as Quantization Method B. PackBits compression is used as Compression Method A because, in error diffusion, dots spread and it is difficult to perform compression, while PackBits compression does not increase data size after compression and produces a small amount of processing load. A compression method (see, for example, Japanese Unexamined Patent Application Publication No. 2003-174565) which has an effect of compressing periodic patterns formed by dithering is used as Compression Method B.

For example, when the interface type is USB and the paper type is photographic glossy paper, the transfer speed is high. Thus, the time required to complete the transfer is not so different depending on each size of print data. The use of Compression Method A only needs a short time for loading the compressed print data. Therefore, by using Quantization Method A and Compression Method A in combination, the time required to complete printing can be reduced.

In addition, when the interface type is Bluetooth and the paper type is photographic glossy paper, the transfer speed is low. Thus, the time required to complete the transfer greatly differs depending on each size of print data. In this case, the transfer time occupies a greater part of the time required to complete printing than the time required to load the print data. Thus, by using Quantization Method B and Compression Method B in combination, the time required to complete printing can be reduced.

As described above, according to the second embodiment of the present invention, by selecting a combination of a quantization method and a compression method in response to an interface type and a printing condition, the time required to complete printing can be reduced.

Since a combination of a quantization method and a compression method can be selectively changed for an interface type, highly periodic data can be obtained depending on the quantization method for use. By using a compression method for efficiently compressing the data, the size of print data can be further reduced.

Although, in the first and second embodiments, a table using a technique for determining a quantization method and a compression method has been described, the determination manner is not limited to the technique using a table. Any type of technique may be used if it can acquire similar information.

A case in which a quantization method and a compression method are determined for a paper type in the printing condition information has been described. However, the printing condition information is not limited to the paper type. Other known conditions that represent printing quality can be used.

Although a quantization method and a compression method are determined based on an interface type and a printing condition, the methods can be determined in accordance with only the interface type.

Although each of USB and Bluetooth has been described as an example of an interface, various types of interfaces, such as IEEE 1284, IEEE 1394, IrDA, and wireless LAN IEEE (802.11), may be used. By setting a quantization method beforehand for the transfer speed of each type of interface, the present invention can be easily applied. Regarding the maximum transfer speeds of major type interfaces, USB 1.1 has a maximum transfer speed of 12 Mbps, USB 2.0 has a maximum transfer speed of 480 Mbps, IEEE 1394 has a maximum transfer speed of 400 Mbps, and Bluetooth has a maximum transfer speed of 1 Mbps.

Third Embodiment

Next, a third embodiment of the present invention is described below.

Figure 7:
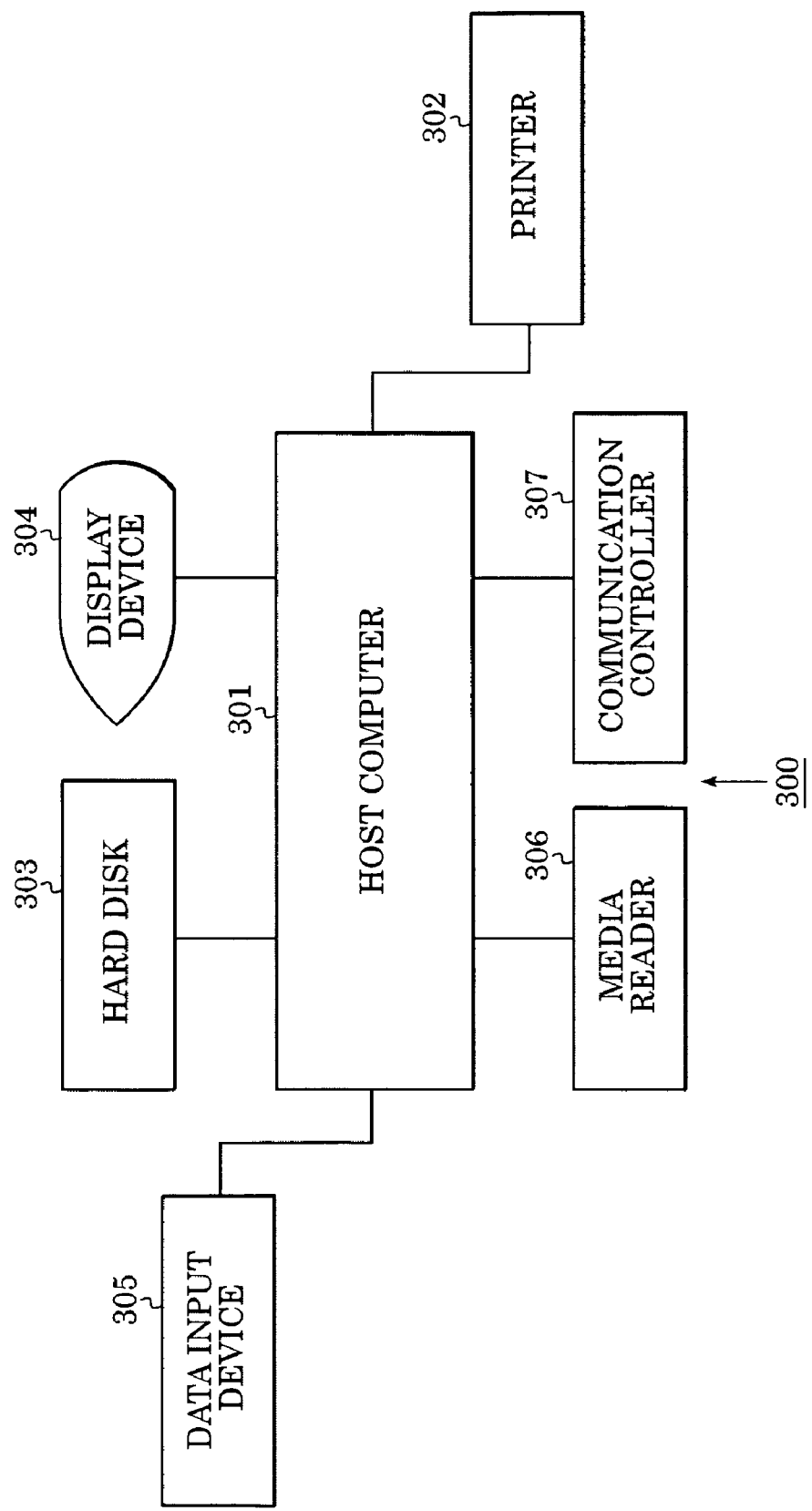
FIG. 7 is a block diagram showing the configuration of a printing system according to a third embodiment of the present invention.

FIG. 7 shows the configuration of a printing system 300 according to the third embodiment of the present invention.

When the printing system 300 uses a printer 302 to print out print data, such as a document or an image, created by an application, which can be activated by a personal computer (host computer) 301 or the like, the printing system 300 quantizes the print data to a level at which it can be output by the printer 302, compresses the quantized print data, and transmits the compressed print data to the printer 302.

The configuration and operation of the printing system 300 are specifically described below.

Configuration of Printing System 300

As shown in FIG. 7, in the printing system 300, the printer 302, a hard disk 303, a display device 304, a data input device 305, a media reader 306, and a communication controller 307 are connected to the personal computer 301. By executing a predetermined system program, the personal computer 301 controls and monitors the printing system 300.

Specifically, the personal computer 301 has, on a system board, a computer function including a CPU, a RAM, and a ROM. By reading a necessary processing program, if needed, from a built-in memory or the hard disk 303, which is an external unit and executing the read program, the CPU controls the operation of the printing system 300.

In the third embodiment of the present invention, various programs that can be executed by the host computer 301 are stored in the hard disk 303. The hard disk 303 stores processing programs for implementing operations in the third embodiment, various applications for generating print data, etc.

A storage location for the processing programs (program code) for implementing operations in the third embodiment is not limited to the hard disk 303 or the built-in memory. For example, by recording the processing programs in portable recording media, such as CD-ROMs (compact disk-ROMs) or flexible disks, in a form readable by the host computer 301, and distributing the recording media, when the printing system 300 is established, the host computer 301 may perform reading the processing programs through the media reader 306 or the communication controller 307, and installing the read programs in the hard disk 303.

In the third embodiment of the present invention, the case of using, for example, Microsoft Windows® as an operating system (OS) for the host computer 301 is described. However, the OS is not limited thereto.

When the printer 302 receives information, such as printing condition settings, as well as the print data from the host computer 301, the printer 302 executes a predetermined printing process to print out the print data on printing paper. For example, each of various printers, such as a serial printer, a page printer, and an electrographic printer, can be used as the printer 302. In addition, as the connection between the printer 302 and the host computer 301, for example, each of various types of connections, such as a stand-alone connection and a network connection, can be used.

The display device 304 displays predetermined windows in response to instructions issued from the host computer 301 by executing the system program, the applications, etc.

The data input device 305 includes, for example, a keyboard and a mouse. The data input device 305 receives various instructions from a user and transmits the instructions to the host computer 301. The data input device 305 transmits, to the host computer 301, for example, printing condition settings for the printer 302 that are input by the user.

The media reader 306 includes a CD-ROM drive and a flexible disk drive. The media reader 306 supplies the host computer 301 with information read from recording media such as the CD-ROM and the flexible disk.

The communication controller 307 is a connection interface for establishing the connection between the printing system 300 and an external network (not shown).

Functional Configuration of Printing System 300

Figure 8:
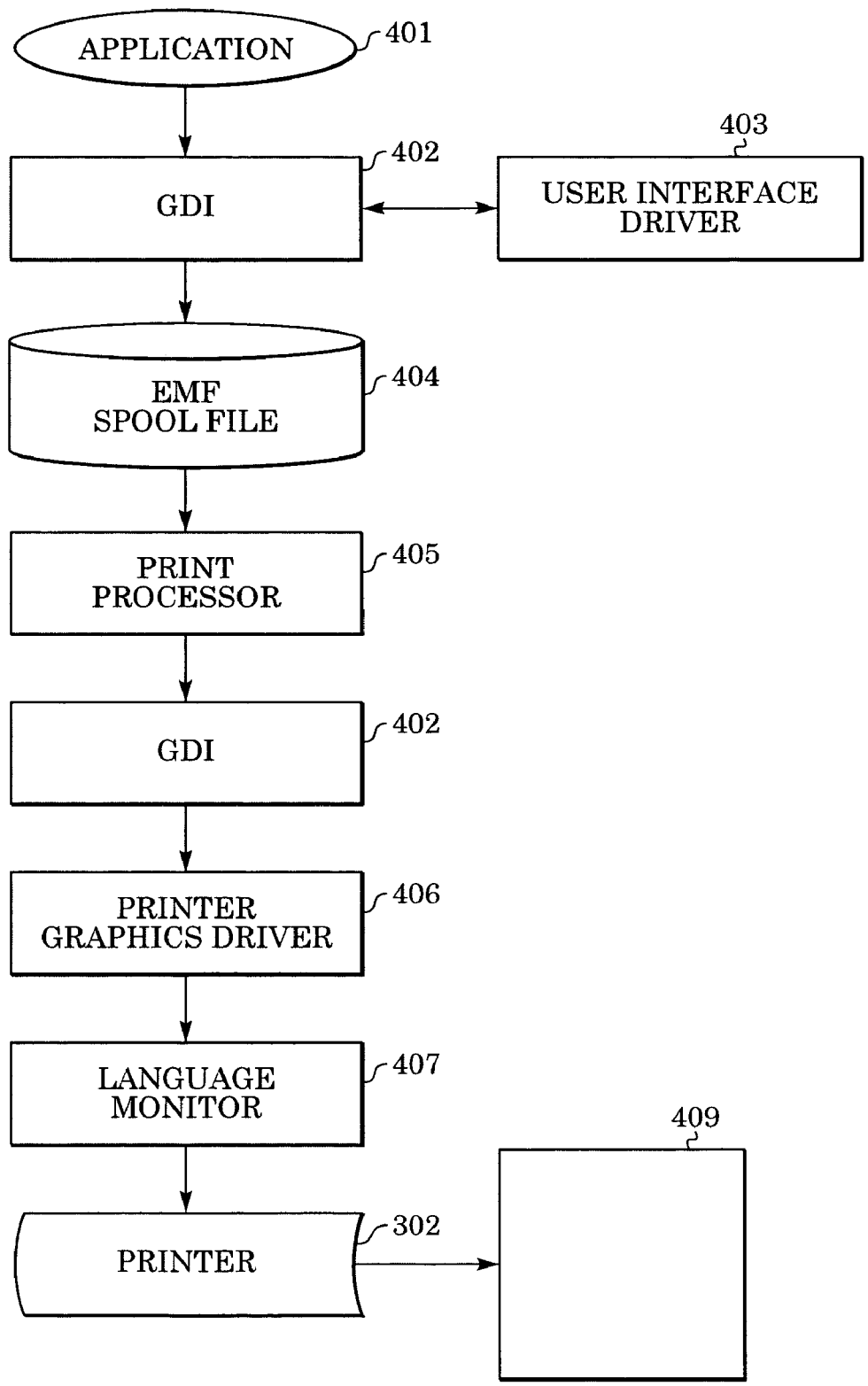
FIG. 8 is a block diagram showing the functional configuration of the printing system shown in FIG. 7.

FIG. 8 shows printing control functions including functions of the printing system 300 which are implemented such that the host computer 301 executes predetermined processing programs.

As shown in FIG. 8, the printing control functions include an application 401, a GDI (graphics device interface) 402, a user interface driver 403, an EMF spool file 404, a print processor 405, a printer graphics driver 406, and a language monitor 407.

At first, main functions included in the printing control functions of the host computer 301 are described below.

The user interface driver 403 has a function of setting printing conditions in the printer 302 through the GDI 402. Specifically, the user interface driver 403 has a function of setting a paper size for use in printing, and other printing conditions, and has a function of setting a quantization method for quantizing print data.

The print processor 405 has a function of processing print data stored in the EMF spool file 404 in units of pages. The printer graphics driver 406 has a function of converting the print data into bitmap data that can be printed out by the printer 302. The language monitor 407 has a function of performing bidirectional communication with the printer 302, acquiring information of the printer 302, and displaying the acquired information on the display device 304. The language monitor 407 also has a function of supplying the printer 302 with the bitmap data generated by the printer graphics driver 406.

Next, consecutive operations of the printing control functions of the host computer 301 are described below.

At first, in response to an operation instruction from the user, the application 401 creates a document and issues an instruction to execute printing of the document data (printing data). This causes the GDI 402 to report a printing start event to the user interface driver 403.

The application 401 uses the GDI 402 to store the document data (printing data) in the EMF spool file 404. At this time, in the EMF spool file 404, printing condition settings are stored beforehand by the user interface driver 403.

The print processor 405 acquires the printing condition settings and the print data from the EMF spool file 404, and supplies the acquired printing condition settings and print data in units of pages to the printer graphics driver 406.

The printer graphics driver 406 uses a data transmitting/receiving unit (not shown) to send a query to the language monitor 407 about an interface type for use in transmitting the print data from the host computer 301 to the printer 302.

Figures 9, 10:
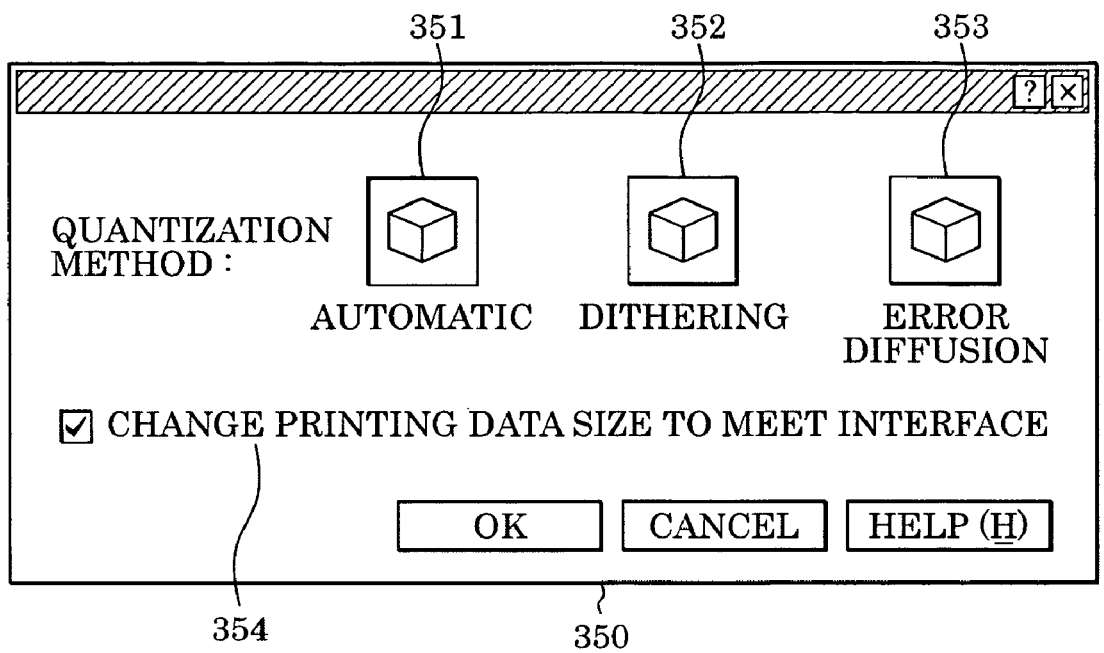
FIG. 9 is an illustration of an example of a setting screen for setting a quantization method in a user interface driver in the third embodiment of the present invention.
FIG. 10 is an example of an interface information table retained in a language monitor in the third embodiment of the present invention.

When the language monitor 407 receives the query about the interface type from the printer graphics driver 406, the language monitor 407 acquires the name of the interface from the OS for the host computer 301, identifies the interface type for use in transmitting the print data from the host computer 301 to the printer 302 by referring to an interface information table 450 internally stored beforehand and reports the identified interface type to the printer graphics driver 406. An information table 450 is shown in FIG. 10 and described later.

Based on the printing condition settings reported by the print processor 405 beforehand and the interface type reported by the language monitor 407, the printer graphics driver 406 determines a quantization method and a compression method by referring to a printing condition information table 550 internally stored beforehand, whose details are described later with reference to FIG. 11.

Based on a graphics drawing command generated by the GDI 402 and the printing condition settings reported beforehand by the print processor 405, the printer graphics driver 406 performs color processing, etc., on printing page data supplied from the print processor 405, uses the determined quantization method to quantize the data to a level outputable by the printer 302, and uses the determined compression method to compress the quantized data, such that printing bitmap data (hereinafter referred to as "printing image data") is generated.

The printer graphics driver 406 supplies the printing image data to the language monitor 407 through a data transmitting unit (not shown).

The language monitor 407 supplies the printing image data supplied by the printer graphics driver 406 to the printer 302 through the interface for use in transmitting the print data from the host computer 301 to the printer 302.

The printer 302 prints out, on printing paper 409, the printing image data supplied from the language monitor 407.

FIG. 9 shows an example of a setting screen 350 displayed on the display device 304 for setting the quantization method in the user interface driver 403.

In FIG. 9, an item 351 is used for the user to select a setting in which the printer graphics driver 406 automatically determines one of "dithering" and "error diffusion" by identifying the content of the print data. An item 352 is used for the user to select a setting in which the printer graphics driver 406 uses dithering to quantize print data. An item 353 is used for the user to select a setting in which the printer graphics driver 406 uses error diffusion to quantize the print data.

An item 354 is used for the user to select a setting in which the printer graphics driver 406 switches the quantization method and the compression method in accordance with the interface for use in transmitting the print data to the printer 302.

FIG. 10 shows an example of the interface information table 450. The interface information table 450 is stored in the language monitor 407.

The interface information table 450 shown in FIG. 10 contains letter strings representing interfaces for use in transmitting the print data to the printer 302, each string consisting of the first three letters of the name of each interface, and types of interfaces for use in transmitting the print data to the printer 302.

FIG. 11 shows an example of the printing condition information table 550. The printing condition information table 550 is stored in the printer graphics driver 406.

The printing condition information table 550 shown in FIG. 11 contains types of interfaces for use in transmitting the printing image data to the printer 302, quantization methods set in the user interface driver 403 and reported from the print processor 405, and quantization methods and compression methods that are used to quantize the print data in response to the quantization methods set in the user interface driver 403. For example, PackBits compression is used as Compression Method A because, in error diffusion, dots spread and it is difficult to perform compression, while PackBits compression does not increase data size after compression and produces a small amount of processing load. A compression method (see, for example, Japanese Unexamined Patent Application Publication No. 2003-174565) that has an effect of compressing periodic patterns formed by dithering is used as Compression Method B.

Operation of Printing System 300

Figure 12:
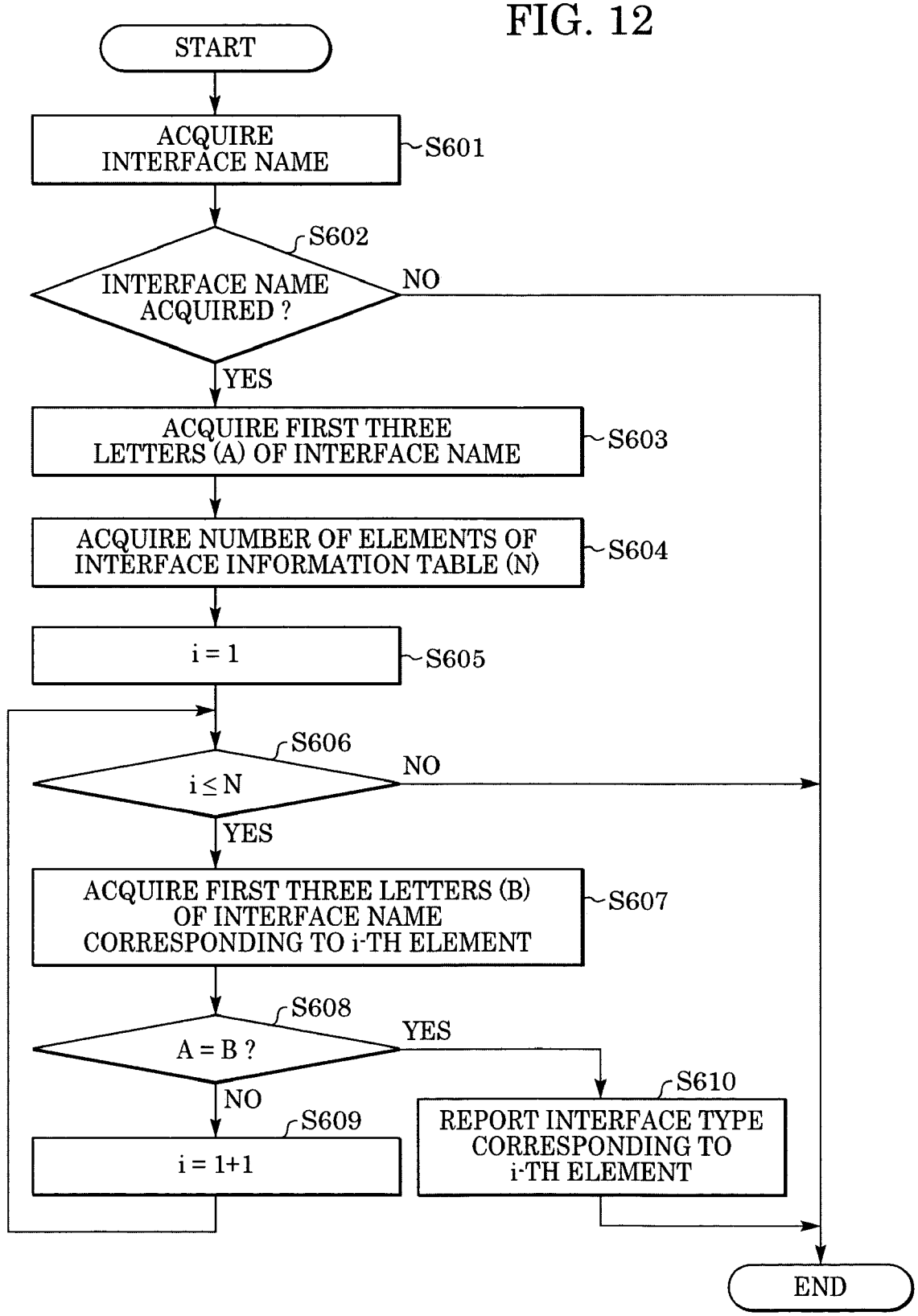
FIG. 12 is a flowchart illustrating a process for reporting, to the printer graphics driver, an interface type used for the language monitor to transmit printing image data in the third embodiment of the present invention.

FIG. 12 is a flowchart illustrating the operation of the printing system 300, specifically, a process in which the language monitor 407 reports, to the printer graphics driver 406, the type of an interface for use in transmitting the print data to the printer 302.

In step S601, from the OS for the host computer 301, the language monitor 407 acquires the name of the interface for use in transmitting the print data to the printer 302.

In step S602, it is determined whether or not the language monitor 407 has acquired the name of the interface in step S601. If, in step S602, it is determined that the language monitor 407 has acquired the name of the interface, the process proceeds to step S603. If, in step S602, it is determined that the language monitor 407 has not acquired the name of the interface, the process ends.

In step S603, the first three letters of the name of the interface acquired in step S601 are acquired. In step S604, the number of elements of the interface information table 450 is acquired. In the example shown in FIG. 10, three types of interfaces are registered. Accordingly, the number of elements is "3".

In step S605, the value of a processing counter is initialized to one since, in steps S606 to S609, by referring to the interface information table 450, the process searches for an interface type corresponding to the name of the interface acquired in step S601.

In step S606, it is determined whether or not the value of the processing counter exceeds the number of items, acquired in step S604, of the interface information table 450. If it is determined that the value of the processing counter exceeds the number of elements of the interface information table 450, the process ends. If the value of the processing counter does not exceed the number of elements of the interface information table 450, the process proceeds to step S607.

In step S607, from the interface information table 450, the first three letters of the name of an interface corresponding to an item in the order represented by the value of the processing counter are acquired. In step S608, it is determined whether or not the first three letters of the interface name acquired in step S603 are identical to the first three letters of the interface name acquired in step S607. If, in step S608, it is determined that the first three letters of the interface names are identical, the process proceeds to step S610. If it is determined that the first three letters of the interface names are not identical, the process proceeds to step S609.

In step S609, the value of the processing counter is incremented by one, and the process returns to step S606. The above steps S606 to S608 are repeatedly performed.

In step S610, the language monitor 407 acquires, from the interface information table 450, an interface type corresponding to an item in the order represented by the value of the processing counter. The language monitor 407 reports the acquired interface type to the printer graphics driver 406, and the process ends.

Figure 13:
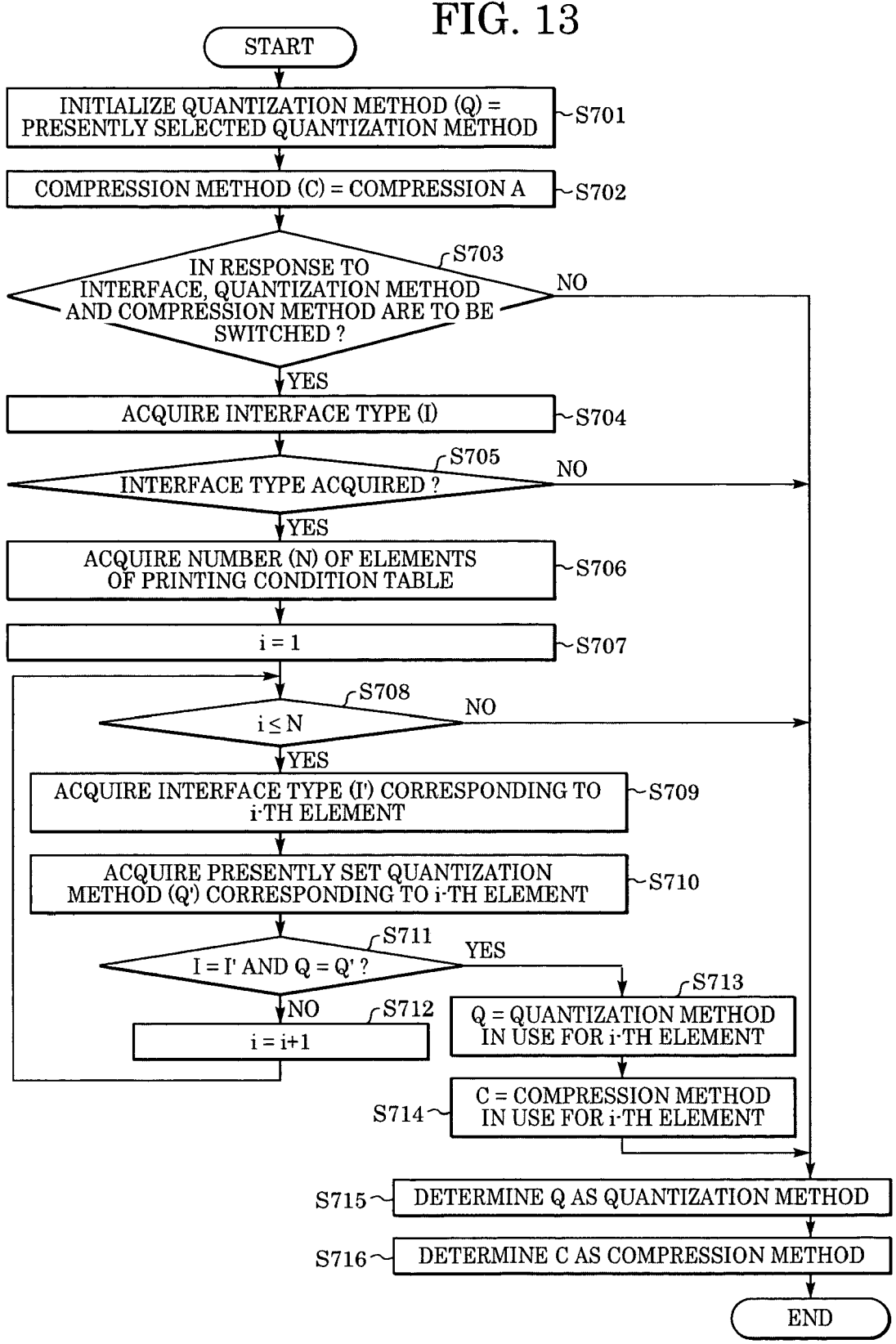
FIG. 13 is a flowchart illustrating a process for determining a quantization method and compression method for use in the printer graphics driver in the third embodiment of the present invention.

FIG. 13 is a flowchart illustrating the operation of the printing system 300, specifically, a process in which the printer graphics driver 406 determines a quantization method and compression method for use.

In step S701, the printer graphics driver 406 initializes a quantization method (Q) into the setting screen 350 shown in FIG. 9 in accordance with the printing condition setting reported from the print processor 405.

In step S702, a compression method (C) is initialized into a predetermined compression method (Compression Method A in this case).

In step S703, the process determines whether or not to switch the quantization method and/or the compression method in response to the interface for use in transmitting printing image data to the printer 302 in accordance with the printing condition setting reported from the print processor 405. If, in step S703, the process determines to switch the quantization method and/or the compression method in response to the interface, the process proceeds to step S704. If in step S703, the process determines not to switch either the quantization method or the compression method in response to the interface, the process proceeds to step S715.

In step S704, the printer graphics driver 406 acquires, from the language monitor 407, the type of the interface for use in transmitting print data from the language monitor 407 to the printer 302. In step S705, it is determined whether or not the printer graphics driver 406 has acquired the interface type in step S704. If it is determined in step S704 that the printer graphics driver 406 has acquired the interface type, the process proceeds to step S706. If it is determined in step S704 that the printer graphics driver 406 has not acquired the interface type, the process proceeds to step S715.

In step S706, the printer graphics driver 406 acquires the number of elements of the printing condition information table 550 shown in FIG. 11. In the case of the printing condition information table 550 shown in FIG. 11, the number of elements is "9".

Since, in steps S708 to S712, based on the interface type acquired in step S704 and the quantization method setting on the setting screen 350 shown in FIG. 9, the process searches for the quantization method and the compression method by referring to the printing condition information table 550, in step S707, the value of the processing counter is initialized to one. In step S708, it is determined whether or not the value of the processing counter exceeds the number of elements, acquired in step S706, of the printing condition information table 550. If this determination indicates that the value of the processing counter exceeds the number of elements acquired in step S706, the process proceeds to step S715. If this determination indicates that value of the processing counter does not exceed the number of elements acquired in step S706, the process proceeds to step S709.

In step S709, the printer graphics driver 406 acquires, from the printing condition information table 550, an interface type corresponding to the order represented by the value of the processing counter. In step S710, the printer graphics driver 406 acquires a quantization method corresponding to an element in the order represented by the value of the processing counter.

In step S711, it is determined whether or not the interface type acquired in step S704 is identical to that acquired in step S709, and whether or not the quantization method setting on the setting screen 350 shown in FIG. 9 is identical to the quantization method acquired in step S710. If this determination indicates that both interface types are identical to each other and both quantization methods are identical to each other, the process proceeds to step S713. If it is determined negatively in step S711, the process proceeds to step S712, and the value of the processing counter is incremented by one. After that, the process returns to step S708.

In step S713, the printer graphics driver 406 overwrites the quantization method (Q) initialized in step S701 by a quantization method for use corresponding to the element in the order represented by the value of the processing counter. In step S714, the compression method (C) initialized in step S702 is overwritten by a compression method for use corresponding to an element in the order represented by the value of the processing counter.

After that, in step S715, the quantization method (Q) is determined as the quantization method for use in quantizing the print data. In step S716, the compression method (C) is determined as a compression method for use in compressing the print data, and the process ends.

As described above, according to the third embodiment of the present invention, a quantization method and a compression method can be determined in response to an interface type and user's preferences.

As described above, according to the third embodiment, when print data, such as a document or image edited by an application, is printed out by a printer, if the printer uses an interface having a low speed at which printing image data is transmitted, by using a quantization method and/or a compression method that reduce the amount of the printing image data, the size of the printing image data can be reduced.

A combination of a quantization method and a compression method can be changed in response to an interface type. Thus, highly periodic data can be obtained depending on a quantization method for use. By using a compression method that efficiently reduces the data, the size of the print data can be further reduced.

In addition, when print data, such as a document or image edited by an application, is printed out by a printer, the time required up until printout can be prevented from greatly differing depending on an interface for use in transmitting printing image data to the printer. Even if the printer uses an interface having a low speed at which the printing image data is transmitted, the time required up until printout can be reduced. This makes it possible to provide a printing system having enhanced usability.

The present invention is not limited to the above embodiments, but can be practiced in various forms.

For example, in the third embodiment of the present invention, based on the first three letters (of the interface name) acquired from the OS for the host computer 301, the type of the interface for use in transmitting the print data to the printer 302 is identified. However, the method for identifying the type of the interface for use in transmitting the print data to the printer 302 is not limited to that in the third embodiment.

The printing condition information table 550 is not limited to the form shown in FIG. 11, but can be changed, as required, in response to changes in various conditions in the printing system 300, such as printer functions. For example, the printing condition information table 550 may have the contents of the table shown in FIG. 14.

Various interfaces, quantization methods, and compression methods, other that those shown in FIGS. 11 and 14, can be used. The quantization method and compression method for use may be changed.

In the second and third embodiments of the present invention, a case in which a quantization method is selected from different quantization methods and in which a compression method is selected from different compression methods has been described. In addition to the above case, the quantization method may determine the number of output bits and/or the compression method may determine a compression ratio.

In the second and third embodiments of the present invention, a quantization method and a compression method are determined in response to an interface type. In addition thereto, only the compression method may be determined in response to the interface type.

Other Embodiments

A storage medium (or a recording medium) containing the program code of software for implementing the functions in the above embodiments may be provided to a system or apparatus, and a computer (or a CPU/MPU (micro-processing unit)) in the system or apparatus reads and executes the program code stored in the storage medium.

In this case, the program code read from the storage medium, itself, implements the functions in the above embodiments. The present invention includes not only a case in which the computer executes the read program code, such that the functions in the above embodiments are implemented, but also a case in which, based on instructions of the program code, an OS active in the computer performs all or part of actual processing and the processing implements the functions in the above embodiments. Storage media for storing program code include, for example, a flexible disk, a hard disk, ROM, RAM, a magnetic tape, a nonvolatile memory card, CD-ROM, CD-R (compact disk-recordable), CD-RW (CD-rewriteable), DVD-ROM (digital versatile disk-ROM), DVD-R, DVD+R (DVD+recordable), DVD-RW, DVD+RW, an optical disk, and a magnetic disk. In addition, computer networks, such as a local area network (LAN) and a wide area network (WAN) can be used to provide the program code.

The present invention also includes a case in which, after program code read from a storage medium is written in a memory in an add-in card inserted into a computer or an add-in unit connected to the computer, based on instructions of the program code, a CPU or the like provided in the add-in card or unit performs all or part of actual processing and the processing implements the functions in the above embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-021299 filed Jan. 29, 2004, which is hereby incorporated by reference herein.

What is claimed is:

1. An information processing apparatus for outputting image-forming print data to an external image-forming apparatus connected to the information processing apparatus through an interface among a plurality of interfaces with different data transfer speeds, the information processing apparatus comprising:
   storing means for storing a printing condition including a type of a paper;
   identifying means for identifying a type of the interface;
   determining means for determining, based on the type of the interface identified by the identifying means, a combination of a quantization method and a compression method for print data; and
   image processing means for quantizing the print data and compressing the quantized print data based on the combination of the quantization method and the compression method determined by the determining means,
   wherein the combination of the quantization method and the compression method based on at least periodicity of the quantized data and compression efficiency in accordance with the periodicity, and
   wherein the print data quantized by the image processing means is output to the external image-forming apparatus through the interface.

2. The information processing apparatus according to claim 1,
   wherein the determining means determines the combination of the quantization method and the compression method based on the type of the paper and the type of the interface by referring to a table.

3. An image forming system comprising:
   the information processing apparatus as defined in claim 1; and
   an image forming apparatus,
   wherein both apparatuses are connected to each other by the interface.

4. An information processing method for outputting image-forming print data to an external image-forming apparatus connected through an interface among a plurality of interfaces with different data transfer speeds, the information processing method comprising:
   storing a printing condition including a type of printer;
   identifying a type of the interface;
   determining, based on the type of interface identified, a combination of a quantization method and a compression method for print data
   quantizing the print data and compressing the quantized print data based on the combination of the quantization method and the compression method determined; and
   outputting the print data quantized to the external image-forming apparatus through the interface,
   wherein the combination of the quantization method and the compression method is based on at least periodicity of the quantized data and compression efficiency in accordance with the periodicity.

5. The information processing method according to claim 4,
   wherein, determining the combination of the quantization method and the compression method is determined based on the type of paper and the type of the interface by referring to a table.

6. A computer-readable medium having stored thereon a program executable by an information processing apparatus, the program having program code for implementing the information processing method according to claim 4.

7. The information processing apparatus according to claim 1, wherein the type of the paper includes at least one of a gloss photo paper and a normal paper.

8. The information processing apparatus according to claim 1, wherein the quantization method is determined from at least one of an effort diffusion method and a dithering method.

9. The information processing apparatus according to claim 1, wherein the determining means determines the combination of the quantization method and the compression method based on the type of the paper and the type of the interface after outputting the compressed print data to the external image forming apparatus via the interface, to minimize a time period before the compressed print data is decompressed.

10. The information processing method according to claim 4, wherein the type of the paper includes at least one of a gloss photo paper and a normal paper.

11. The information processing method according to claim 4, wherein the quantization method is determined from at least one of an effort diffusion method and a dithering method.

12. The information processing method according to claim 4, wherein the combination of the quantization method and the compression method is determined based on the type of the paper and the type of the interface after outputting the compressed print data to the external image forming apparatus via the interface, to minimize a time period before the compressed print data is decompressed.

* * * * *